(12) United States Patent
Tamaki

(10) Patent No.: US 7,143,160 B2
(45) Date of Patent: Nov. 28, 2006

(54) EVENT-DRIVEN INFORMATION DISPLAY SYSTEM AND EVENT-DRIVEN INFORMATION DISPLAY METHOD

(75) Inventor: Kenichi Tamaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 687 days.

(21) Appl. No.: 09/917,908

(22) Filed: Jul. 31, 2001

(65) Prior Publication Data

US 2002/0129101 A1    Sep. 12, 2002

(30) Foreign Application Priority Data

Mar. 9, 2001    (JP)    ............................. 2001-066485

(51) Int. Cl.
*G06F 15/173*    (2006.01)
(52) U.S. Cl. ...................... 709/224; 709/223; 709/228
(58) Field of Classification Search ................ 709/228, 709/224, 223
See application file for complete search history.

(56) References Cited

U.S. PATENT DOCUMENTS

2002/0091874 A1*  7/2002  Jones et al. ................. 709/330
2002/0107940 A1*  8/2002  Brassil ........................ 709/219

FOREIGN PATENT DOCUMENTS

JP          7-28736       1/1995
JP          2000-20316    1/2000

* cited by examiner

*Primary Examiner*—Jason Cardone
*Assistant Examiner*—Adnan M. Mirza
(74) *Attorney, Agent, or Firm*—Staas & Halsey LLP

(57) ABSTRACT

An event-driven information display system and an event-driven information display method are provided in which advertisements, contents and the like are able to appeal to users effectively and efficiently at a low advertising expense. A server 10 and a client 30 are connected to each other through the Internet 20. The client 30 includes a control section 32 for detecting the generation of an event. The client 30 sends a category defined corresponding to the event detected by the control section 32 to the server 10, receives advertising information sent from the server 10 and displays it based on the category received. The server 10 includes a category/content correlation table 16 which stores advertising information defined corresponding to correlation information. The server 10 reads out, from category/content correlation table, advertising information corresponding to the correlation information sent from the client 30 and sends it to the client 30 where it is displayed by a browser 36.

11 Claims, 5 Drawing Sheets

| events | actions |
| --- | --- |
| OS event 1 | "ABC" word processor: launch |
| OS event 2 | "XYZ" spreadsheet program: launch |
| OS event 3 | route navigation program |
| OS event 4 | TV: launch |
| application event 1 | TV: display Channel 8 |
| application event 2 | TV: display Channel 10 |
| OS event 5 | "aaa" word processor: launch |
| OS event 6 | mail program: launch |
| application event 3 | mail program: select an image |
| OS event 7 | browser: launch |
| application event 4 | browser: display www.aaa.co.jp |

(b)

| actions | categories |
| --- | --- |
| "aaa" word processor V8: launch | "aaa" company, word processor |
| "aaa" word processor viewer: launch | "aaa" company, word processor |
| document management program: launch | "aaa" company, word processor |
| "ABC" word processor: launch | "ABC" company, word processor |
| browser: display http://www.aaa.co.jp | browser, "aaa" company site |
| browser: display http://www.xyz.net/ | browser, "xyz" company site |
| @controller: actuated | "xyz" product |
| @mail program: launch | "xyz" product |
| @menu: launch | "xyz" product |

(c)

| categories | advertisements (and contents) |
| --- | --- |
| "aaa" company, word processor | advertisement type A |
| browser, "aaa" company site | advertisement type B |
| "xyz" product | advertisement type C |

EVENT-DRIVEN INFORMATION DISPLAY SYSTEM AND EVENT-DRIVEN INFORMATION DISPLAY METHOD

BACKGROUND OF THE INVENTION

1. Field of the Invention

The present invention relates to a technology for providing cooperation between events (launch, actions, etc., of an application) generated at a client and information sent from a server to the client, and more particularly, it relates to an event-driven information display system and an event-driven information display method in which pieces of information such as advertisements, contents and the like corresponding to various operations or actions of a client are displayed at the client.

2. Description of the Related Art

At present, various methods and technologies are used for computerized advertising and information delivery. For instance, there is a method in which a means for accessing advertisements, contents and the like related to an application is built in the application in such a manner as to register a URL of a Web site in a menu of the application in advance. In this case, the user can access the advertisements, contents and the like related to the application by launching the application and selecting a corresponding menu.

Moreover, when a user is intended to acquire information related to an application from a Web site in cases where the application is not provided with such a means or function as referred to above, it is common for the user to acquire, through his or her own operation, the URL of the Web site where the advertisements, contents and the like related to the application are shown, by using search pages on Webs, search software, a collection of links or the like. In addition, there is a technique in which a corporate advertisement is displayed in a browser window pasted on the desktop of a personal computer and replaced with another one at regular intervals.

There is also another technique disclosed in Japanese Patent Application Laid-Open No. 11-134353 entitled "Individual-specific Advertisement Delivery Method, Individual-specific Advertisement Delivery System, and Recording Medium On Which An Individual-specific Advertisement Distribution Program Is Recorded". This technique enables advertisements to be distributed to users according to a consistency or matching level between a field to which the user frequently accesses and a field to which the advertisements belong. In addition, Japanese Patent Application Laid-Open No. 11-272574 discloses a further technique entitled "Information Delivery Method, Information Delivery System, And Recording Medium On Which An Information Delivery Processing Program Is Recorded". This technique enables information, which is suited to the browser's state to be used, the age, the occupation, the taste, and the physical condition of a user, etc., to be distributed to the user. Further, Japanese Patent Application Laid-Open No. 2000-20316 discloses a system which is capable of carrying out the settings of the operating environments of pre-installed applications, which have conventionally been done manually for each computer. Besides, Japanese Patent Application Laid-Open No. 7-28736 discloses a method in which when a client program and a server program are running on different computers, respectively, connected to each other via a network, the amount of data to be exchanged between the client and server programs upon generation of an event can be reduced, thereby preventing a deterioration in the communication performance on the network.

However, there is a limitation on the number of advertisements, contents and the like able to be displayed in a rectangular area (e.g., a browser window, etc.) which is provided on the desktop of a personal computer. Therefore, the information delivery methods and techniques as referred to above cannot meet the demands of enterprises (advertisers or sponsors) which want to produce earnings by displaying a lot of advertisements, contents and the like in a limited rectangular area as effectively as possible. Moreover, it is important to the sponsors that the advertising expenses are suppressed to low costs and that the advertisements, contents and the like appeal to target users without fail, which are, however, difficult to achieve by using the prior art methods and techniques.

In addition, advertisement and information display methods disclosed in Japanese Patent Application Laid-Open No. 11-134353 and Japanese Patent Application Laid-Open No. 11-272574 are proposed from the standpoints of sponsors and users, but they can not fulfill the needs of both the sponsors and users as mentioned above to any satisfactory extent. In addition, Japanese Patent Application Laid-Open Nos. 2000-20316 and 7-28736 describe a method of automating the installation of an application and a method of improving the communication performance of a network, respectively, but any of these methods does not lead to a satisfactory solution for the problems as mentioned above.

SUMMARY OF THE INVENTION

The present invention is made in view of the circumstances referred to above, and has for its object to provide an event-driven information display system and an event-driven information display method in which advertisements, contents and the like are able to appeal to users effectively and efficiently at a low advertising expense by displaying the advertisements, contents and the like corresponding to the generation of a user's event in a limited advertising frame or area.

To solve the above-mentioned problems, according to an event-driven information display system and an event-driven information display method of the present invention, events such as launching, actions, etc., of an application and display information such as advertisements, contents, etc., are stored in databases or the like while being correlated to each other by means of correlation information, and when the generation of an event is detected, a piece of display information related to that event is read out from the databases or the like and displayed in a browser window or the like based on the detected event using the correlation information. In a preferred embodiment of the present invention, categories corresponding to events are employed as the correlation information, and each piece of display information is stored in the databases or the like using a category as a key, so that the databases or the like are searched in accordance with the generation of an event to retrieve a piece of display information corresponding to that event.

In addition, the event-driven information display system and the event-driven information display method of the present invention can be applied to a client-server system. In this case, in order to receive and display a piece of display information corresponding to an event generated in a client from a server connected to the client by way of an electric communication line or network, the client detects the generation of the event and sends out a piece of correlation information (e.g., category in a preferred form of the invention) corresponding to the event thus detected, so that the server retrieves a piece of display information such as an advertisement, etc., from the databases or the like using the category received as a key and sends it to the client, which then displays the display information sent from the server with a browser or the like. Note that the client may be a personal computer, a portable terminal, etc., but it may be anything having a communication function.

Moreover, the client determines whether it is on-line or off-line, and when determined as on-line, the client receives and displays a piece of display information from the server as described above, whereas when determined as off-line, the client reads out a piece of display information from the databases stored in the client itself, and displays it. The databases stored in the client itself are updated by downloading the latest version of the databases from the server while the client is on-line, whereby the client is able to display up-to-date information without displaying old information even when it is off-line.

The above and other objects, features and advantages of the present invention will become more readily apparent to those skilled in the art from the following detailed description of preferred embodiments of the present invention taken in conjunction with the accompanying drawings.

BRIEF DESCRIPTION OF THE DRAWINGS

FIGS. 5(a) through 5(c) illustrate examples of the storage conditions of various databases.

DESCRIPTION OF THE PREFERRED EMBODIMENTS

Now, preferred embodiments of the present invention will be described in detail while referring to the accompanying drawings.

Figure 1:
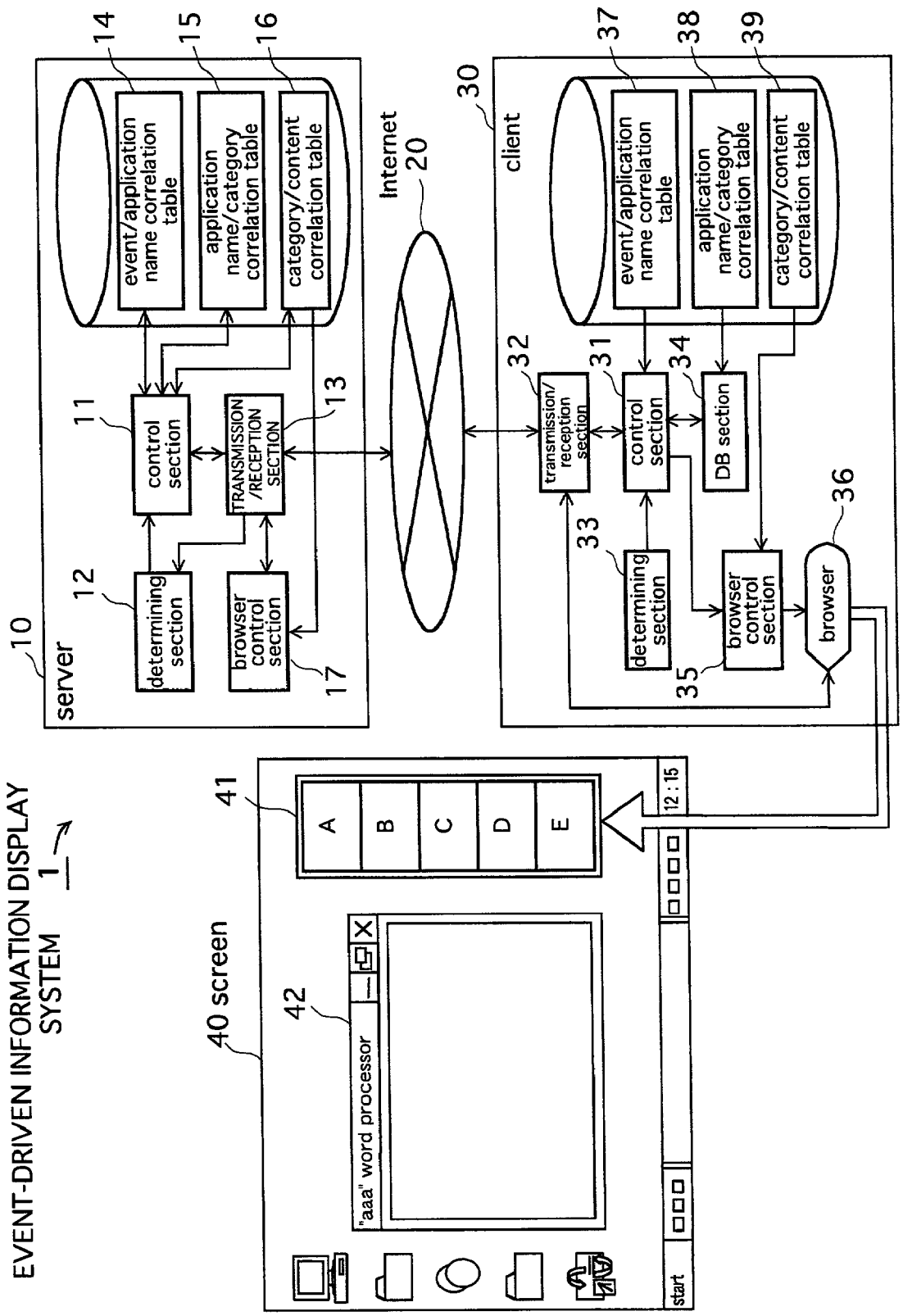
FIG. 1 is a block diagram schematically illustrating the basic component of an event-driven information display system according to an embodiment of the present invention.

FIG. 1 is a block diagram schematically illustrating the basic configuration of an event-driven information display system according to an embodiment of the present invention. In this figure, the event-driven information display system, generally designated at reference numeral 1, includes a server machine or computer 10 (hereinafter simply referred to as a server) and a client machine or computer 30 (hereinafter simply referred to as a client) which are connected to each other for communication through a communication line or network in the form of the Internet 20, so that when there takes place an event such as a launch, an action, etc., of an application in the client 30, advertising information stored in the server 10 or the client 30 itself is displayed at the client 30 in correspondence to the event. Here, note that the client 30 is a personal computer, a portable terminal, etc., but may be anything having a communication function of communicating with the server 10. In addition, the system of this embodiment is constructed such that it is able to specify the category of an event generated and display advertising information corresponding to the category at the client 30. A screen 40 shown in FIG. 1 is an example of displaying such advertising information, illustrating an appearance that advertising information 41 (e.g., advertisements A through E) is displayed upon starting of an "aaa" word processor 42. The advertising information 41 to be displayed corresponding to an event may includes either all of the advertisements A through E, or some (one or more) of them.

When the client 30 is on-line, the server 10 receives from the client 30 the category corresponding to an event generated in the client 30, and sends out advertising information related to the received category to the client 30. The server 10 includes a control section 11 for controlling various functions, a version determining section 12 for determining the version of each database stored in the client 30, a transmission and reception section 13 for controlling connection to and communication with the Internet, a browser control section 17 for correlating categories received from the client 30 to advertising contents to be displayed at the client 30, and a variety of databases having an event/application name correlation table 14 in which events generated in the client 30 and application names corresponding to the respective events are stored in a mutually correlated manner, an application name/category correlation table 15 in which application names and corresponding categories are stored in a mutually correlated manner, and a category/content correlation table 16 in which categories and corresponding advertising information are stored in a mutually correlated manner.

When the client 30 is on-line, it receives from the server 10 advertising information corresponding to an event generated and displays it, whereas when off-line, the client 30 reads out related advertising information from the databases stored in itself and displays it. The client 30 includes; a control section 31 which serves to catch an event or an action of an operating system (OS) or other applications when a user operates an application in the client 30 and control various functions in the client 30; a transmission and reception section 32 for controlling connection to and communication with the Internet 20; a determining section 33 for determining whether the client 30 is on-line or off-line; a database (DB) section 34 for correlating the name of an application operated to a corresponding category; a browser 36 for displaying advertisements; and a browser control section 35 for controlling the browser 36 and correlating a category to a corresponding an advertisement or advertising content to be displayed when the client 30 is off-line.

In addition, the client 30 further includes a variety of databases having an event/application name correlation table 37 in which events generated in the client 30 and application names corresponding to the respective events are stored in a mutually correlated manner, an application name/category correlation table 38 in which application names and corresponding categories are stored in a mutually correlated manner, and a category/content correlation table 39 in which categories and corresponding advertising information are stored in a mutually correlated manner. Note that when the client is on-line, the variety of databases in the client 30 are checked as to whether they are up-to-date, and if not, they are updated to the latest version.

Figure 2:
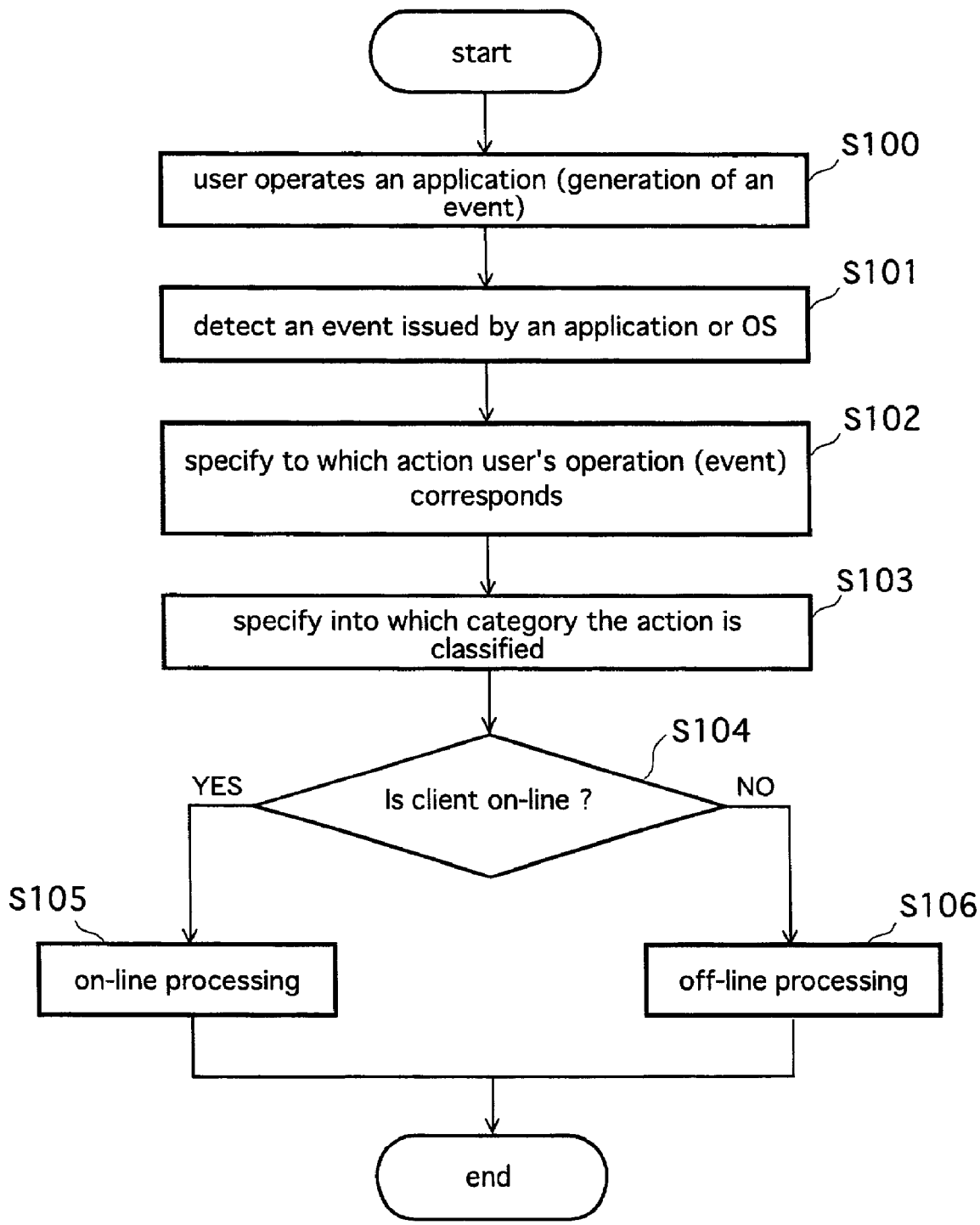
FIG. 2 is a flow chart explaining in detail the operation of the event-driven information display system according to the embodiment of the present invention.
Figure 3:
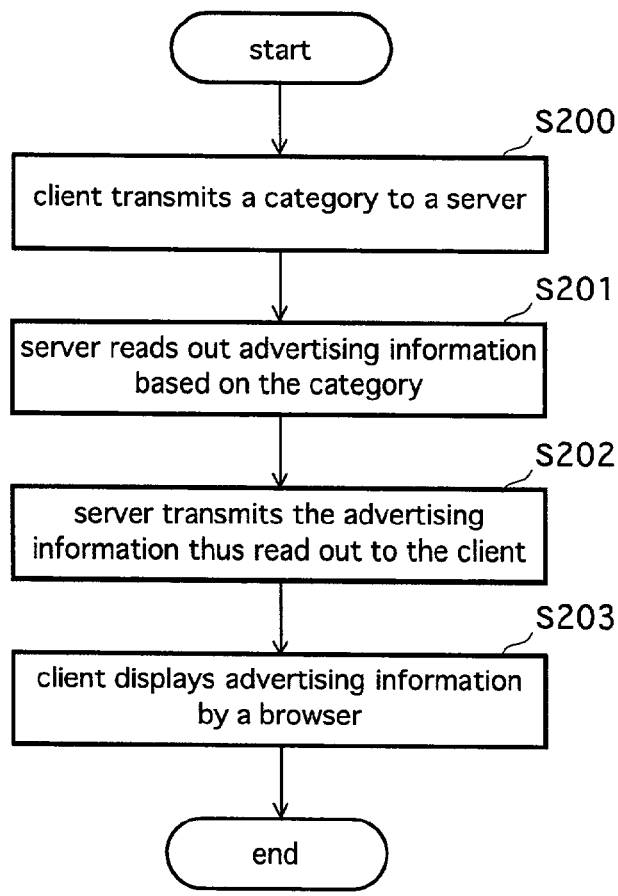
FIG. 3 is a flow chart explaining the details of the operation in an on-line state.
Figure 4:
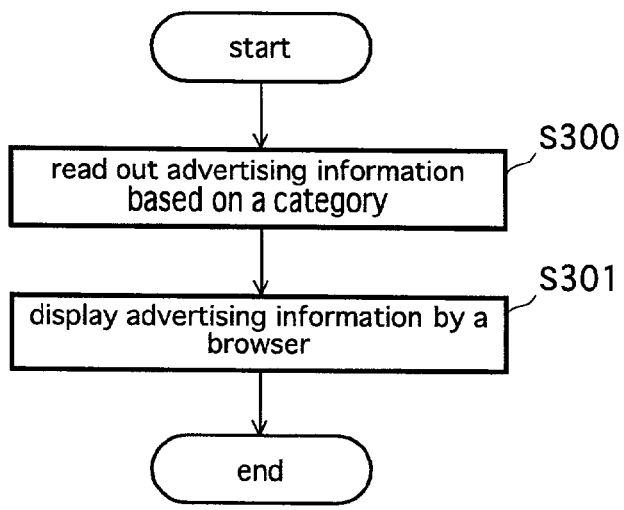
FIG. 4 is a flow chart explaining the details of the operation in an off-line state.

FIGS. 2 through 4 are flow charts illustrating in detail the operation of the event-driven information display system according to this embodiment. First of all, when the user of the client 30 (hereinafter, simply referred to as user) operates, at the client side, an application installed in the client 30, the control section 31 of the client 30 detects an operation or action (i.e., an event) of the application (in step S100). Note that actions or events of an application include not only the launching of the application but also the execution of a command inside the application and a change in the status inside the application, and that the detection of such an event is carried out by the control section 31 detecting a signal representative of the generation of an event issued by the application or OS. The control section 31 specifies "the name and action of the application" (hereinafter, simply referred to as action) from an event concerned while referring to the event/application name correlation table 37 (in step S102).

An example of the event/application name correlation table 37 is illustrated in FIG. 5(*a*). For instance, in cases where an event generated is the launch of an application entitled ""aaa" word processor", the control section 31 specifies, from a signal issued by the OS (hereinafter called "OS event 5"), the application name as ""aaa" word processor" and the operation or event as "launch" while referring to the event/application name correlation table 37.

Thereafter, the control section 31 transmits a corresponding action to the DB section 34, which specifies a category corresponding to the action while referring to the application name/category correlation table 38 (in step S103). An example of the application name/category correlation table 38 is illustrated in FIG. 5(*b*). For instance, in cases where an action is the launch of the "aaa" word processor, the DB section 34 specifies the category as ""aaa" Company and word processor" referring to the application name/category correlation table 38, and sends the category thus specified to the control section 31.

Then, the control section 31 determines by reference to the determining section 33 as to whether the client 30 is on-line or off-line (in step S104). When the client 30 is on-line, on-line processing is performed (in step S105), whereas when the client 30 is off-line, off-line processing is carried out (in step S106).

Next, processing in the case of the client 30 being on-line will be described in detail while referring to FIG. 3. The control section 31 converts the category received from the DB section 34 into data of such a form as being able to be received by the browser control section 17 of the server 10. Such a conversion may be made by rewriting a coolie of the browser 36, or adding a key word after a URL. The converted data is transmitted from the transmission/reception section 32 through the Internet 20 to the URL where the browser control section 17 of the server 10 exists. In this manner, the category is transmitted to the server 10 (in step S200).

In the server 10 receiving the category, the browser control section 17 reads out advertising information (including contents, etc.) corresponding to the received category while referring to the category/content correlation table (in step S201). An example of the category/content correlation table is illustrated in FIG. 5(*c*). For instance, in cases where the category is ""aaa" Company and word processor", the control section 11 reads out an advertising type or advertisement A as advertising information to be transmitted to the client 30 while referring to the category/content correlation table in FIG. 5(*c*). The advertising information thus read out is transmitted from the transmission/reception section 13 to the browser 36 of the client 30 through the Internet 20 (in step S202). In the client 30 receiving the advertising information, the browser 36 displays the advertising information received on the screen 40, as shown in FIG. 1 (in step S203).

When an application related to the word processor is launched, advertisements of the enterprise selling the word processor, upgrade information of the word processor or the like may concretely be displayed as an advertisement, alternatively when a route navigation (searching or planning) application is launched, advertisements, contents or the like concerning travelling, tickets, reservations, etc., may be displayed. Additionally, events may include various commands inside an application such as "preparation of a drawing", "selection of options", etc., in addition to the launch of an application, and when such an event or command is executed, it is of course possible to display advertising information corresponding to the event executed. Moreover, preferably, the advertisements to be displayed may be banner ones, and each banner picture displayed may be correlated to a URS so that a Web page containing useful information can be displayed only by clicking the banner picture displayed at the client 30, thereby making it possible for the user to obtain more information.

Here, it is to be noted that in this system, the number of pieces of information to be displayed may be set by the browser 36 of the client 30, so that the number of pieces of advertising information to be displayed can be controlled by the server 10 or the client 30 in accordance with the setting of the browser 36.

Now, processing in the case of the client 30 being off-line will be described in detail while referring to FIG. 4. When the client 30 is off-line, no communications between the client 30 and the server 10 are performed, and hence all processing is carried out within the client 30. Concretely, first, the control section 31 of the client 30 transmits the category received from the DB section 34 to the browser control section 35, which in turn reads out advertising information corresponding to the received category from the category/content correlation table 39 (in step S300). Note that the category/content correlation table 39 is similar to the category/content correlation table 16. The advertising information thus read out is transmitted from the browser control section 35 to the browser 36, which then displays the advertising information as in the above-mentioned on-line processing (in step S301). Thus, in this system, even when the client 30 is in a state of off-line, the client 30 can display useful advertisements by referring to the databases stored in itself.

However, the databases stored in the client 30 are not necessarily up-to-date, and hence there is a possibility that the advertisements to be displayed at the client 30 become old. Therefore, it is necessary to update the databases stored in the client 30 in order to enable the latest information to be displayed as much as possible even when the client 30 is off-line, and the system of the present invention supports such an updating.

Figure 6:
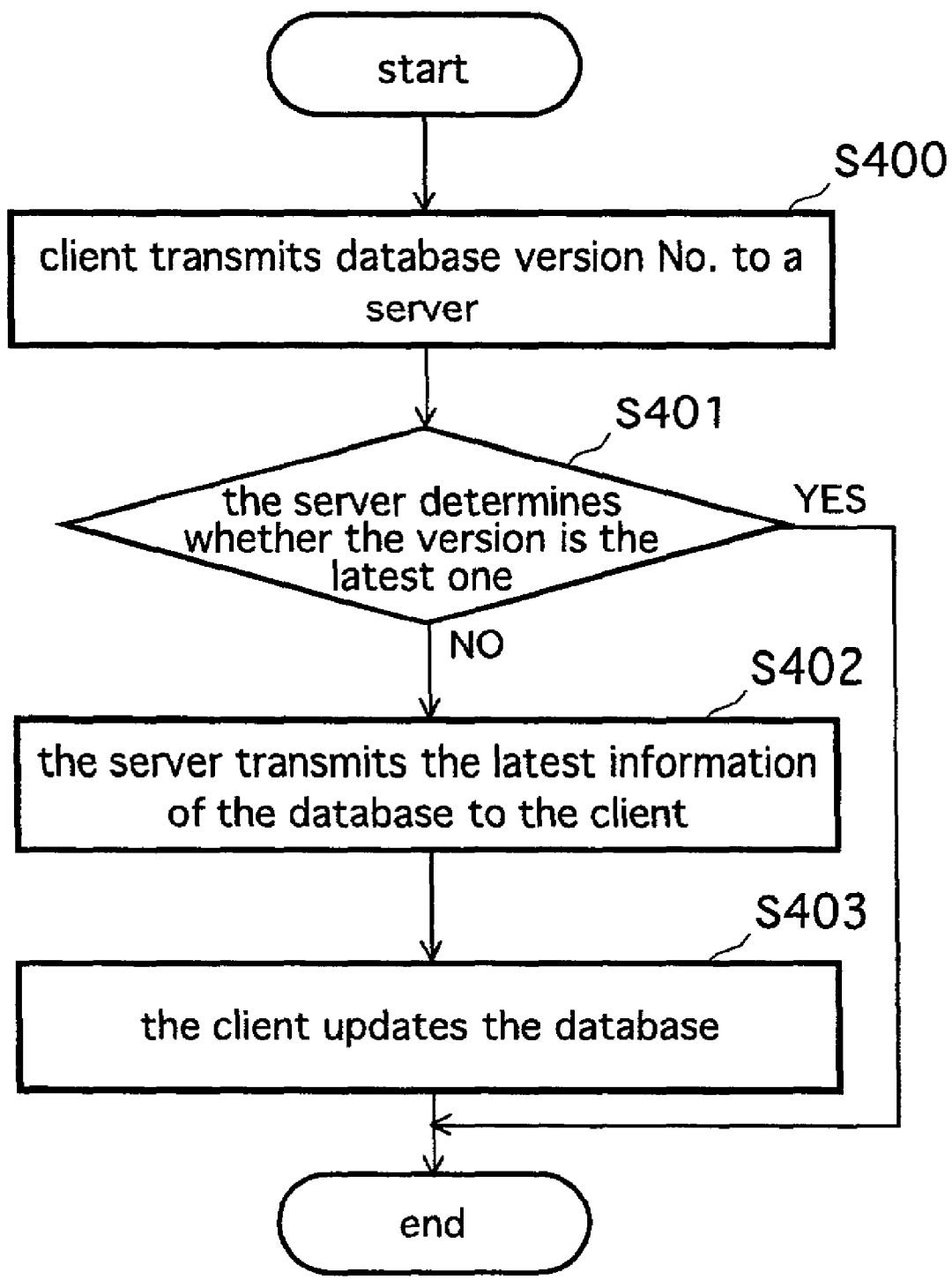
FIG. 6 is a flow chart explaining the details of updating of the databases.

Thus, reference will be made to the updating of the client's databases in detail while referring to FIG. 6.

In this embodiment, when the client 30 is on-line upon occurrence of an event, update processing is performed. Concretely, the client 30 first transmits an e/c level or version of a database thereof to the server 10 through the Internet 20 (in step S400). The method of transmitting the e/c level may be a method of rewriting a cookie of the browser 36 or a method of adding a key word to the end of a URL, as in the case of a category. Moreover, when the client 30 transmits a category to the server 10 as shown in FIG. 3, an e/c level of a database may also be sent together with the category.

In the server 10 receiving the e/c level, the control section 11 determines whether the received e/c level is the latest version, while referring to the version determining section 12 (in step S401). When it is up-to-date (YES in step S401), updating is not performed, and advertising information alone is transmitted to the client 30. On the other hand, when it is not the latest version, the control section 11 reads out the latest information of the corresponding database from either one of the event/application name correlation table 14 or the application name/category correlation table 15 or the category/content correlation table 16, and transmits it to the client 30 from the transmission/reception section 13 through the Internet 20 (in step S402). In the client 30 acquiring the latest information of the database, the control section 31 updates the corresponding database into an up-to-date version (in step S403).

Although in the above-mentioned embodiment, the category corresponding to an operation or action of an application is transmitted to the server 10, various data other than categories may be sent from the client 30 to the server 10, so that information displayed at the browser 36 can be diversified. For instance, if the Internet Protocol (IP) address of the client 30 is acquired and sent to the server 10 upon connection of the client 30 to the Internet 20, the browser 36 of the client 30 will be able to display local information, etc., around the IP address concerned while referring to the databases stored in the server 10. Similarly, by launching an application to acquire position information such as GPS upon connection of the client 30 to the Internet 20, it is possible to transmit the current position of the client 30 to the server 10.

In addition, the e/c level of an application launched in the client 30 may be transmitted to the server 10, so that when a corrected version or the latest data of the application is prepared at the server, it is also possible to display information such as "Please download a corrected version or the latest data" at the client 30. Furthermore, if a television or radio channel is transmitted from the client 30 to the server 10 when an application is launched for operating television or radio by connecting the client 30 to the Internet 20, the client 30 can display advertisements, contents and the like in accordance with the channel transmitted. Concretely, the system may be configured such that program schedules, etc., corresponding to channels are stored in the databases of the server 10, and advertising information corresponding to the feature of each program can be retrieved from the databases. This configuration makes it possible to easily display advertisements, contents and the like according to each channel.

If this system is employed, it is also possible to suppress the advertising expenditures of sponsors to low costs. In an exemplary charging system, for example, advertising charge is set for each application to be correlated to an advertisement(s), or for each category in which an application is included, and in this case, a low charge is set for an application not frequently used. A sponsor or advertiser may pay an advertising charge as a location toll to a provider, who provides a rectangular area (i.e., an advertising area in which advertisements are displayed by the browser 36) on the desktop of the client 30 such as a personal computer, so that a charge is made according to how frequently the sponsor or advertiser uses the rectangular area, thereby permitting the advertiser of infrequent use to suppress the advertising expense to a low cost.

Moreover, there is another charging system in which the number or amount of pieces of advertising information transmitted from the server 10 to the client 30 is counted by the server 10 each time a piece of advertising information is transmitted from the server 10 to the client 30 while the client is on-line, so that a sponsor or advertiser can pay to a provider, who provides a rectangular area on the desktop of the client 30, an advertising charge as an update fee according to the number or amount of advertisements counted. In addition, the advertising charge may be collected according to the place (position) where an advertisement is displayed on the desktop.

Although various embodiments of the present invention have been described in the foregoing, the present invention is of course not limited to the above-mentioned embodiments, but can be applied to various systems without departing from the spirit and scope of the present invention as defined in the appended claims.

The present invention displays on a user's browser information such as advertisements, contents and the like related to an event such as a launch, an action, etc., of an application by a user, in accordance with the generation of such an event. Thus, a lot of effective advertisements, contents and the like corresponding to an event can be displayed within a limited display frame on the desktop of a personal computer, etc., thereby appealing to the user timely and efficiently. In addition, since advertisements, contents and the like closely related to the user are displayed on the desktop, the availability of the displayed information becomes high for the user.

Moreover, in the case of a client-server system, correlation information corresponding to an event generated in the client is sent from the client to the server in accordance with the generation of such an event, and then information such as advertisements, contents and the like to be displayed at the client based on the correlation information is sent from the server to the client. Thus, if the correlation information to be sent to the server is unrelated to the personal information of the user, the danger of raw or original private information being leaked on the network will be reduced to improve security. In addition, in cases where the advertisements displayed at the client are linking with URLs of Web sites which are managed at the client, there is a possibility that links are cut off or missed when the URLs are changed. In this case, according to the present invention, URLs are managed on the server so that the contents in the server can always be updated, thus obviating the problem of missing links. As a result, the advertisements and contents have effective links at all times and hence become able to appeal to the user.

In addition, according to the present invention, advertisements and contents to be displayed are managed by the server so that advertisements and URLs of the latest version can be downloaded from the server to the client, enabling advertisements of a limited available period, region-specific or local advertisements, etc., to be displayed on the desktop of the client. Further, according to the present invention, the client may be provided with files of advertising display information so that even when the client is off-line, information of concern can be read out from the files of the client to display corresponding advertisements in accordance with an action or the like of an application. Thus, it becomes possible to make useful advertisements corresponding to an event appeal to the user. Moreover, when the client is on-line, the latest version of the information files to be displayed at the client can be downloaded from the server to the client to automatically update old files, thus enabling up-to-data advertisements to be displayed while avoiding displaying old ones even when the client is off-line.

Furthermore, in cases where information to be displayed by the browser comprises advertisements, event-related advertisements can be displayed upon occurrence of an event, so it is possible for the sponsor or advertiser to effectively and efficiently perform sales promotion or the like to target users for whom the information is to be displayed. Also, the information to be displayed by the browser may be regional or local information, and in this case, the correlated information to be transmitted to the server may be an IP address or the like, instead of a category, at the time when the client is connected to the Internet, so that the information corresponding to the region or location to which the IP address is applied can be displayed, enabling the user to obtain very useful information timely. Moreover, the information to be displayed by the browser may be the version of an application software. For instance, assuming that an event of the client is a launch of an application, and that the correlation information to be transmitted from the client to the server is the version of the launched application, upgrade information would be able to be displayed at the client when the version of the application concerned is upgraded, thus leading to an improvement in the information providing service and enhancing user's satisfaction as well.

What is claimed is:

1. An event-driven information display system comprising:
　a client; and
　a server connected to said client through an electric communication line;
　wherein said client receives display information corresponding to an event generated therein from said server through said electric communication line for display, and
　wherein said client includes:
　　an event detecting section detecting the generation of an event;
　　a storage section storing events and pieces of display information by correlating them with respect to each other with correlation information, and
　　an on-line condition determining section determining whether said client is on-line or off-line,
　wherein when said on-line condition determining section determines that said client is on-line, said client transmits to said server correlation information that is defined corresponding to said event detected by said event detecting section without reading out the previously received display information from said storage section, and receives new display information sent from said server based on said correlation information to display it, and
　wherein when said on-line condition determining section determines that said client is off-line, said client reads out from said storage section the previously received display information correlated to an event detected by said event detecting section using said correlation information and displays said display information thus read out, and
　wherein said server includes a display information storage section storing display information defined corresponding to said related information, reads out from said display information storage section display information corresponding to said related information sent from said client, and transmits it to said client so that said display information sent from said server is displayed at said client.

2. The event-driven information display system according to claim 1, further comprising an updating section updating contents stored in said storage section of said client by transmitting the latest contents from said server to said client.

3. The event-driven information display system according to claim 1, wherein said display information comprises one or more advertisements.

4. The event-driven information display system according to claim 1, wherein said display information comprises local information or version information of application software.

5. An event-driven information display client adapted to be connected to a server through electric communication line for receiving display information corresponding to an event generated therein from said server for display, said client comprising:
　an event detecting section detecting the generation of an event,
　a storage section storing events and pieces of display information by correlating them with respect to each other with correlation information; and
　an on-line condition determining section determining whether said client is on-line or off-line;
　wherein upon said on-line condition determining section determining that said client is on-line said client transmits to said server correlation information, which is defined corresponding to said event detected by said event detecting section without reading out the previously received display information from said storage section, receives new display information sent from said server, based on said correlation information, and displays the received display information, and
　wherein upon said on-line condition determining section determining that said client is off-line said client reads out from said storage section the previously received display information correlated to an event detected by said event detecting section using said correlation information and displays said read-out display information.

6. The event-driven information display system according to claim 1, wherein the display section displaying said display information read out by said display information reading section is a limited frame of a larger display area.

7. An event-driven information display method for displaying predetermined display information in accordance with an event generated, said method comprising:
　detecting a generation of an event in a client;
　correlating the event and display information received from a server in the client;
　storing the correlated event and display information in the client;
　determining whether the client is on-line or off-line;
　upon determining that the client is on-line, further:
　　transmitting, from the client to the server, correlation information that is defined corresponding to said detected event without reading out the previously received stored display information,
　　receiving new display information from the server based on said correlation information for display, and
　　displaying the received display information, and
　upon determining that said client is off-line, further:
　　reading out from a client storage section the previously received display information correlated to the detected event using said correlation information, and
　　displaying said display information thus read out.

8. An event-driven information display method for receiving display information at a client, the display information corresponding to an event, from a server for display, comprising:
　detecting a generation of the event;

correlating the event and display information;
storing the correlated event and display information;
determining whether the client is on-line or off-line; and
upon determining the client is on-line, further:
- transmitting the correlation information to a server correlation information without reading out the previously received stored display information,
- receiving new display information from a server based on the correlation information, and
- displaying the display information.

9. A computer-readable storage storing a program controlling a computer to execute processing by which predetermined display information is displayed in accordance with an event generated, said program comprising:

detecting a generation of an event in a client;
correlating the event and display information received from a server in the client;
storing the correlated event and display information in the client;
determining whether the client is on-line or off-line; and
upon determining that the client is on-line, further:
- transmitting, from the client to the server, correlation information that is defined corresponding to said detected event without reading out the previously received stored display information,
- receiving new display information from the server based on said correlation information for display, and
- displaying the received display information, and upon determining that said client is off-line, further:
  - reading out from a client storage section the previously received display information correlated to the detected event using said correlation information, and
- displaying said display information thus read out.

10. A data recording medium adapted to be read by a computer and recording data for making said computer execute processing by which predetermined display information is displayed in accordance with an event generated, comprising:

stored events and pieces of display information which are correlated to each other by correlation information,
wherein upon an on-line condition determining section determining that a client is off-line said client reads out from a storage section the previously received display information correlated to an event detected by said event detecting section using said correlation information and displays said read-out display information, and
wherein upon said the on-line determining section determining that a client is on-line said client transmits to said server correlation information without reading out the previously received stored display information.

11. The medium according to claim 10, wherein the predetermined display information is displayed in a limited frame of a larger display area.

* * * * *